United States Patent
Gebhard

(10) Patent No.: US 9,195,457 B1
(45) Date of Patent: Nov. 24, 2015

(54) INTERACTIVE APPLICATION PROGRAMMING INTERFACE DOCUMENTATION

(71) Applicant: Amazon Technologies, Inc., Reno, NV (US)

(72) Inventor: Derek Steven Gebhard, Huntington Beach, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/301,982

(22) Filed: Jun. 11, 2014

(51) Int. Cl.
*G06F 9/44* (2006.01)

(52) U.S. Cl.
CPC ........................................ *G06F 8/73* (2013.01)

(58) Field of Classification Search
USPC .................................................. 717/123–129
IPC .................................. G06F 8/34,8/37, 8/70, 8/73
See application file for complete search history.

(56) References Cited

U.S. PATENT DOCUMENTS

| | | | |
|---|---|---|---|
| 6,708,324 B1 * | 3/2004 | Solloway et al. | 717/124 |
| 6,785,884 B1 * | 8/2004 | Rieschl | 717/129 |
| 6,901,581 B1 * | 5/2005 | Schneider | 717/124 |
| 6,941,545 B1 * | 9/2005 | Reese et al. | 717/130 |
| 7,024,660 B2 * | 4/2006 | Andrade et al. | 717/124 |
| 7,093,236 B2 * | 8/2006 | Swaine et al. | 717/128 |
| 7,133,820 B2 * | 11/2006 | Pennello et al. | 703/22 |
| 7,266,809 B2 * | 9/2007 | Tsubata et al. | 717/129 |
| 7,299,454 B2 * | 11/2007 | Pugh et al. | 717/125 |
| 7,331,002 B2 * | 2/2008 | Rivard et al. | 714/35 |
| 7,331,039 B1 * | 2/2008 | Yip et al. | 717/125 |
| 7,426,717 B1 * | 9/2008 | Schang et al. | 717/124 |
| 7,490,319 B2 * | 2/2009 | Blackwell et al. | 717/124 |
| 7,665,068 B2 * | 2/2010 | Neumann et al. | 717/125 |
| 7,853,929 B2 * | 12/2010 | Klein | 717/129 |
| 7,979,848 B2 * | 7/2011 | Hinchey et al. | 717/127 |
| 8,117,597 B2 * | 2/2012 | Shia | 717/123 |
| 8,429,618 B2 * | 4/2013 | Hogan | 717/126 |
| 8,458,653 B2 * | 6/2013 | Hudson et al. | 717/109 |
| 8,473,910 B2 * | 6/2013 | Skriletz | 717/123 |
| 8,495,590 B2 * | 7/2013 | Bates | 717/129 |
| 8,677,325 B2 * | 3/2014 | Batthish et al. | 717/127 |
| 8,707,275 B2 * | 4/2014 | Mascaro et al. | 717/135 |

OTHER PUBLICATIONS

Nichols, "Augmented Bug Localization Using Past Bug Information", ACM, pp. 1-6, 2010.*
Hierons et al, "Using Formal Specifications to Support Testing", ACM Computing Surveys, vol. 41, No. 2, Article 9, pp. 1-76, 2009.*
Aleen et al, "Input-Driven Dynamic Execution Prediction of Streaming Applications ", ACM, pp. 315-324, 2010.*
Briquet et al, "Reproducible Testing of Distributed Software with Middleware Virtualization and Simulation", ACM, pp. 1-11, 2008.*

* cited by examiner

*Primary Examiner* — Anil Khatri
(74) *Attorney, Agent, or Firm* — Baker & Hostetler LLP

(57) ABSTRACT

Documentation for an application programming interface may include a source code portion. Input may be received from a user of the documentation indicating a request to see a simulated result of executing the source code portion. A set of instructions corresponding to the source code portion may be loaded. State dependencies of the set of instructions may be resolved to form an execution environment for the instructions. Simulated results for executing the source code portion may be obtained by executing the instructions based on the execution environment.

20 Claims, 8 Drawing Sheets

INTERACTIVE APPLICATION PROGRAMMING INTERFACE DOCUMENTATION

BACKGROUND

Documentation for application programming interfaces ("APIs") may contain written descriptions of the various functions included in the interface. The descriptions may include function signatures and listings of the various parameters that might be supplied to a function. The description might also include various samples that show developers how the API might be used. The samples may be segments of source code that are not connected to any particular application program. In order to utilize the segment of source code, a developer may copy the segment of source code into the source code of another program, adjust various parameters, and then compile and run the program. Documentation may also include complete programs, however in order to use these a developer may ordinarily download the program file or files to a hard drive and then compile and run the program.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
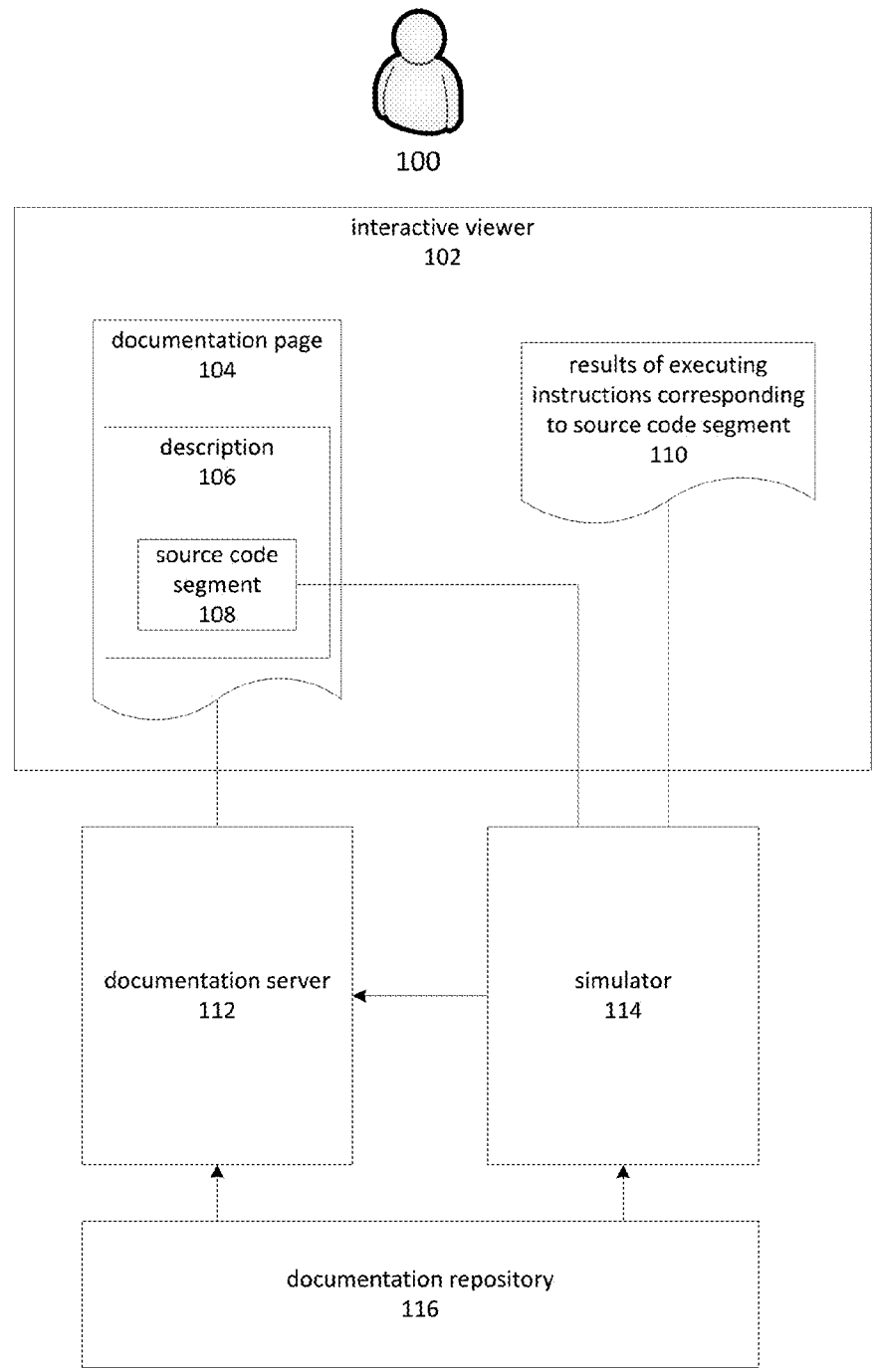
FIG. 1 is a block diagram depicting an example embodiment of a system for providing API documentation including interactivity with source code segments included in the documentation.

Various embodiments are presented herein for providing interactive documentation for APIs. Interactive documentation for application programming interfaces may include mechanisms allowing a developer to interactively explore the features and behavior of API functions. This may, for example, include allowing a developer experiment with parameter values that may be supplied to an API function, and see the results of executing the API function with those parameters through the user interface of the documentation. This approach allows exploration and experimentation of an API function without needing to copy sample code to a source code editor or needing to write application framework code in order to allow the sample to be run.

Embodiments may form a series of executable instructions that, when executed, simulate the effect of executing the partial segments of source code displayed in documentation for API. The simulation may correspond to executing an invocation of an API as described in the documentation, were that invocation to be included in actual source code, supported by appropriate preparatory and follow-on instructions, compiled to executable instructions and run. The results of the simulation may then be displayed to the developer. Accordingly, embodiments may allow the developer to execute and view the results of executing a source code segment included in API document, without having to write, compile and execute a "throw-away" program whose primary, if not only, purpose is to support execution of the source code segment.

Simulating execution of a documented source code segment may involve forming or locating a set of computer-executable instructions corresponding to the source code segment, and construction of an execution environment. These categories of actions may be separate actions or may be combined. Examples of various approaches are provided herein.

A set of computer-executable instructions may be formed by compiling the source code segment included in the API documentation. In various embodiments, API documentation may include demarcations or other forms of metadata to indicate which portions of the documentation contain source code segments. A set of computer-executable instructions may also be retrieved from a repository associated with the documentation. Metadata in the documentation may be used to indicate the location of a set of instructions corresponding to a source code segment in the documentation.

Embodiments may construct an execution environment in which the computer-executable instructions may be run. An execution environment may be formed to include memory locations initialized to values compatible with execution of the instructions corresponding to the source code segment. The memory locations may be those that are referenced, directly or indirectly, by the executable instructions corresponding to the source code segment of the documentation. The memory locations may, for example, correspond to global variables or parameters referenced explicitly or implicitly by the source code segment.

FIG. 1 is a block diagram depicting an example embodiment of a system for providing API documentation including interactivity with source code segments included in the documentation. A user 100 may interact with an interactive viewer 102 to view API documentation. The interaction may comprise various aspects, including but not limited to navigating to the descriptions of various API functions, invoking simulation of source code segments referred to in the documentation, editing values to be used in the simulation (such as parameter values for API functions to be executed), viewing results of the simulation and so forth. An interactive viewer 102 may comprise various editing facilities allowing in-place editing of code samples, or facilities for editing the values of parameters to be used in a simulation of executing the source code sample.

Documentation presented to the user by interactive viewer 102 may comprise a documentation page 104 provided by a documentation server 112. A documentation page 104 may comprise a hypertext markup language ("HTML") page, extensible markup language ("XML") data or other format for providing documentation information. A documentation server 112 may include a code module or executable process for providing documentation information to interactive viewer 102. In some embodiments, documentation server 112 may be integrated into interactive viewer 102. In other cases and embodiments, an interactive viewer 102 and documentation server 112 may be separate. For example, an interactive viewer 102 might comprise a web browser while documentation server 112 comprises a web server that serves HTML pages.

A documentation page 104 may comprise various elements, including a description 106 and a source code segment 108. A description 106 might comprise text, graphics or other information explaining the purpose and use of an API function. It might further comprise a source code segment 108. A source code segment 108 may include one or more lines of source code, but does not necessarily include all of the lines of source code or other elements (such as makefiles, resource files and so forth) that make up the source code for an executable program. In some cases and embodiments, source code segment 108 may not be source code per se, but may be related to source code. For example, a function name and a description of parameters that might be supplied to the function could still be considered as a source code segment 108.

An interactive viewer 102 may provide a mechanism allowing a user to initiate a simulation of a source code segment 108. For example, a button or hyperlink for initiating simulation might be displayed adjacent to a description 106 of a function and associated parameters, or adjacent to a code sample.

A simulator 114 may perform operations involving forming or obtaining executable instructions corresponding to source code segment 108, and may perform operations involving forming an execution environment usable in conjunction with executing the instructions. Although simulator 114 is depicted as a single element in FIG. 1, the operations it is depicted as performing may be combined with other elements in various ways. For example, documentation server 112 might perform operations for locating executable instructions corresponding to source code segment 108, and an execution environment might be constructed by interactive viewer 102. In other embodiments, operations of this type might be performed on a web server associated with documentation server 112. Numerous other combinations and permutations are possible.

A documentation repository 116 may comprise of a storage device bearing one or more files or other mechanisms for storing information. The files may contain documentation information including documentation page 104. The information may be retrieved by documentation server 112 and by simulator 114. The documentation repository may, in some cases and embodiments, contain executable instructions corresponding to source code referred to in the documentation, such as source code segment 108. Simulator 114 may retrieve the executable instructions corresponding to source code segment 108 in response to a request to simulate the behavior of source code segment 108.

Figure 2:
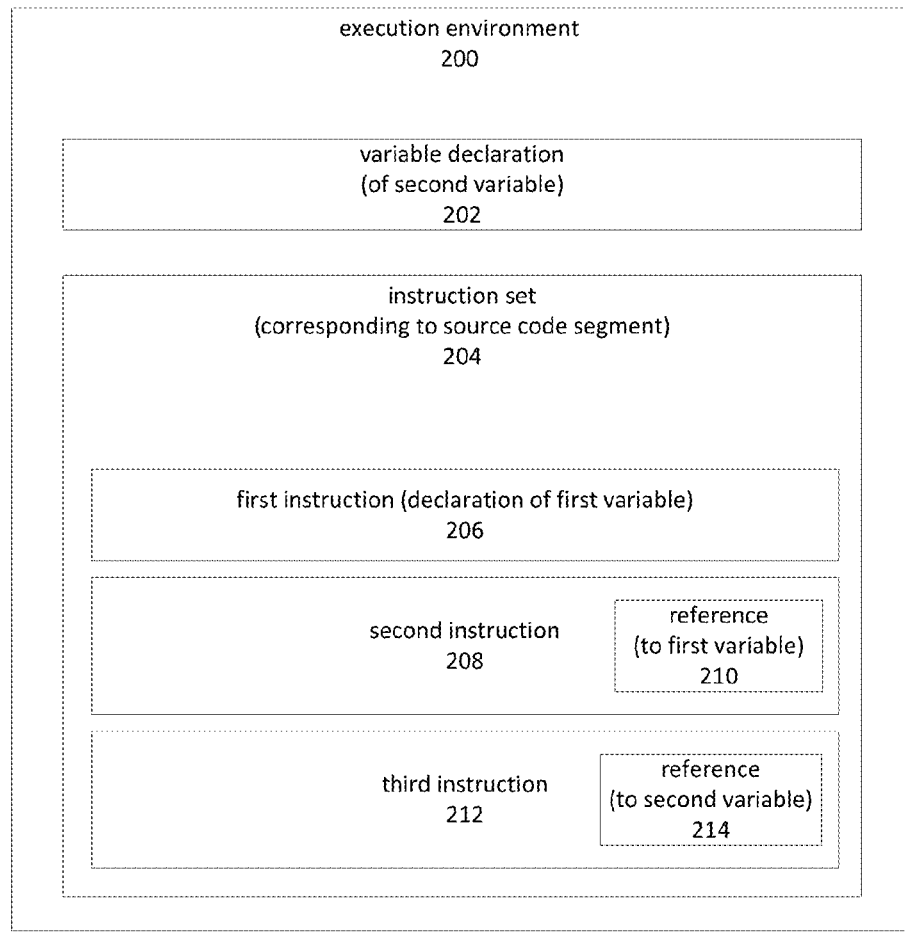
FIG. 2 is a block diagram depicting initialization of variables referred to by a block of executable instructions corresponding to a segment of source code embedded in documentation.

A simulator 114 may form an execution environment for executing the instructions corresponding to source code segment 108. One aspect of forming an execution environment involves initialization of variables referenced by the instructions. FIG. 2 is a block diagram depicting initialization of variables referred to by a block of executable instructions corresponding to a segment of source code embedded in documentation.

In the example provided by FIG. 2, an instruction set 204 corresponding to a source code segment could comprise a first instruction 206 which explicitly declares a first variable. A second instruction 208 might contain a reference 210 to the first variable. Execution of instruction set 204 would therefore cause this variable to be declared and initialized prior to its being referenced. On the other hand, instruction set 204 might also contain a third instruction 212, containing a reference 214 to a second variable which is not explicitly declared. This variable may be supplied by execution environment 200, which might contain or otherwise supply a variable declaration 202 for the second variable.

Embodiments may employ a number of approaches to declare and initialize variables. One such approach may involve reserving memory locations referenced by the instructions, or reserving memory locations and fixing-up the instructions to refer to those memory locations. Another approach involves using code generation to generate a sequence of instructions to allocate and, if necessary, initialize variables that are later referenced by the instructions. In some embodiments, instructions corresponding to a source code segment may be dynamically generated, in which case instructions for declaring and initializing variables may generated along with instructions corresponding to the source code segment.

Figure 3:
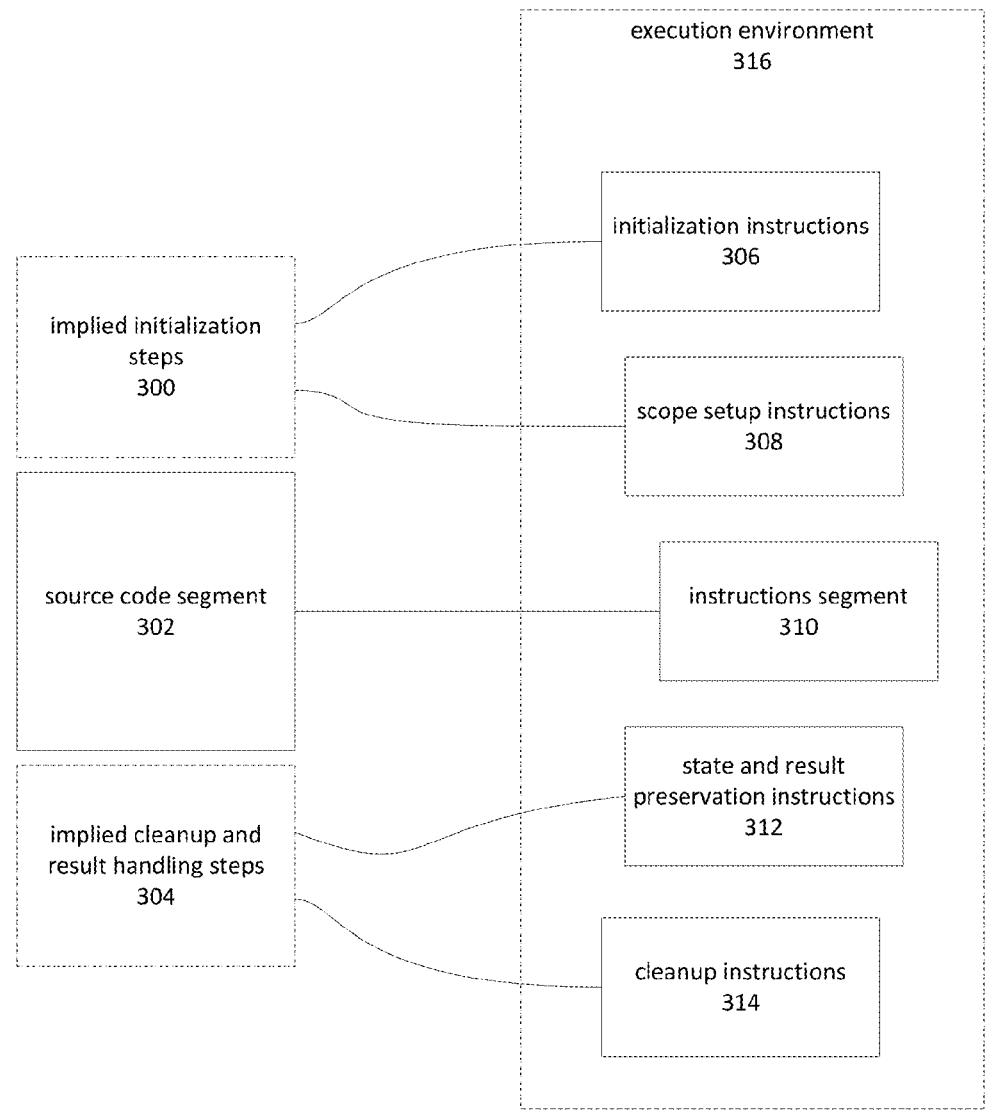
FIG. 3 is a block diagram depicting formation of an execution environment using generated code.

FIG. 3 is a block diagram depicting formation of an execution environment using generated code. A source code segment 302 may be associated with instructions that correspond to source code segment 302. In FIG. 3, these are depicted as instruction segment 310. Embodiments may locate or retrieve instruction segment 310 from a repository, or form the instructions through techniques such as compiling or interpreting source code segment 302.

An embodiment of an execution environment 316 may comprise a temporary program which may, for example, be constructed and stored in random-access memory and subsequently executed. The temporary program may be assembled from various sources, and may include instruction segment 310 and additional instructions for initializing and uninitializing program state, environment simulations or other resources used for executing instruction segment 310.

Embodiments may determine that implied initialization steps 300 should be performed prior to execution of instruction segment 310. Various implied initialization steps 300 may, for example, be needed to allocate and initialize variables referred to by instruction segment 310, or to initialize other aspects of program state depended upon by instruction segment 310.

Initialization instructions 306 may comprise instructions to establish program state needed for execution of instructions segment 310. For example, an API function referred to in a source code segment 302 might require that some other API function (such as an initializeAPI( ) or setupAPI( ) function) be called beforehand. In some cases, there may be a comparatively long chain of state dependencies, such as when an API function in a source code segment 302 utilizes structures or objects defined by an API that are initialized through the use of other API functions. In some embodiments, initialization instructions 306 may involve initialization of or communication with a virtual device, such as a simulated mobile phone or virtual computer, on which the API functions in instructions segment 310 may interact. A virtual device used for simulating execution of source code segment 302 may, in some embodiments, be made accessible to a user for interacting with the device subsequent to simulating execution of a source code portion. A user might, for example, interact with the virtual device to determine what effect executing the source code portion would have on the device.

Scope setup instructions 308 may comprise instructions for allocating memory for variables referred to by instructions segment 310, and setting initial values for those variables when necessary. In some cases variables may be complex types such as structures or objects. As noted, there may be cases where API functions are used to initialize structures or objects. In other cases, programming language constructs for allocating or initializing variables may be employed.

Embodiments may determine that various implied cleanup and result handling steps 304 are to be performed following the simulated execution of source code segment 302. These steps may include performing state and result preservation instructions 312 and cleanup instructions 314.

State and result preservation instructions 312 may comprise instructions for handling the results of executing instructions segment 310. This may involve instructions for storing return values and output parameters in a memory location where they may be retrieved later. Embodiments may, for example, utilize a visualization mechanism to display the results of executing the API to the developer. In some embodiments, the result of executing an API may be visual, auditory, mechanical and so forth. Result handling instructions may therefore involve interaction with device components that produce these effects. In some embodiments, simulated environments may be used for result handling. For example, a mobile phone might be simulated so that the graphical output of an API function may be viewed by the developer in a graphical simulation of the mobile phone.

Some embodiments may preserve results for use with subsequent interactive simulations. For example, a developer might initiate a simulation of a first API function. A second API function might take the output of the first API function as input. After experimenting with the first API function, the developer might wish to feed the output of the first API function into the second API function. Embodiments may preserve the results of the first API function for this purpose. In some embodiments, a graphical indication of the result may be provided, and may be accompanied by an indication that the result might be useful in conjunction with another API function.

Various cleanup instructions 314 might also be utilized to perform various housekeeping functions associated with execution of the other preceding instructions. For example, memory or other resources allocated during execution of the preceding instructions may be freed. Some embodiments may close or suspend a simulated computing environment if one was used during execution of the preceding instructions.

Embodiments may perform implied initialization steps 300 by forming initialization instructions 306 and scope setup instructions 308. Forming instructions may comprise identifying state depended upon by instructions segment 310 and then forming instructions that perform the initialization. This may, for example, be performed using a mechanism such as a code emitting API. In some embodiments, initialization instructions 306 may be located or retrieved rather than generated. For example, a repository may contain instructions segment 310 corresponding to source code segment 302, and also contain initialization instructions 306 and scope setup instructions 308. The repository might also maintain a correspondence between instructions segment 310 and initialization instructions 306. Correspondence might also be identified using metadata stored in a repository of API documentation. For example, a file containing API documentation might also contain a source code segment and information that could be used to locate both instructions segment 310, initialization instructions 306 and scope setup instructions 308. The techniques just described might also be applied to forming other instructions used in simulating execution of source code segment 302, such as state and result preservation 312 and cleanup 314.

Figure 4:
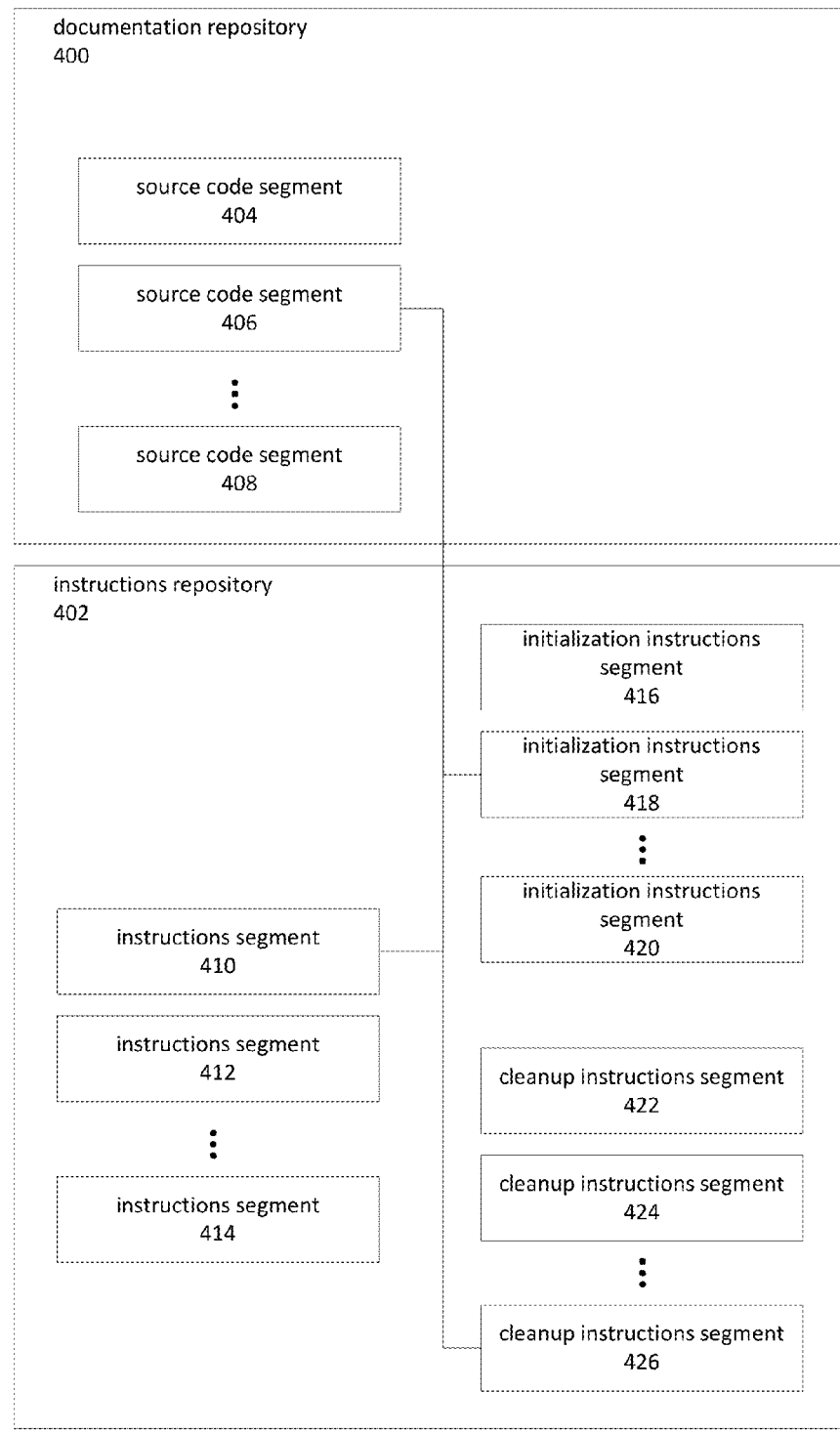
FIG. 4 is a block diagram depicting a mechanism for forming an execution environment for simulating execution of a source code segment embedded in API documentation.

FIG. 4 is a block diagram depicting a mechanism for forming an execution environment for simulating execution of a source code segment embedded in API documentation. Embodiments may maintain one or more correlations between source code segments found in a documentation repository 400 and instruction segments found in an instructions repository 402. A documentation repository 400 may comprise one or more files stored on a computer-readable storage device. An instructions repository may also comprise one or more files stored on a computer-readable storage device, and may include file types including, but not limited to, dynamic and static link libraries, executable files, archive files and so forth.

A documentation repository 400 may comprise one or more source code segments 404, 406 and 408. These may be included in various portions of API documentation maintained in documentation repository 400. Embodiments may include metadata or other information associated with a source code segment to link that segment to executable instructions that may be used to provide a simulated execution of a source code segment. For example, in FIG. 4 various links are shown between source code segment 406 and initialization instructions segment 418, instructions segment 410 and cleanup instructions segment 426.

An instructions repository 402 may contain various instruction segments for performing aspects of simulating execution of source code segments 404-408 found in document repository 400. An instructions segment may be a function or method corresponding to a defined interface, or it may be a sequence of instructions not making up a complete function or method. An instructions segment may contain executable instructions or intermediate-level instructions for performing aspects of the simulation. For example, with reference to FIG. 3, instruction segments may correspond to performing implied initialization steps 300, simulation of source code segment 302, and implied cleanup and result handing steps 304.

Instructions corresponding to preparing for the simulation, for example those similar to implied initialization steps 300 in FIG. 3, may be performed by executing one or more of initialization instructions segments 416, 418 and 420. Instructions for simulating the execution of one of source code segments 404, 406 and 408 may be performed by executing one or more of instructions segments 410, 412 and 414. Instructions corresponding to cleanup, such as those similar to implied cleanup and result handling steps 304 depicted in FIG. 3, may be performed by executing one or more of cleanup instructions segments 422, 424 and 426.

Embodiments may utilize links between source code segments 404, 406 and 408 and instructions in instruction repository 402 to execute instructions that simulate the effect of executing a source code segment. For example, in FIG. 4 source code segment 406 is depicted as being associated by various links to initialization instructions segment 418, instructions segment 410, and cleanup instructions segment 426. Embodiments may identify links associated with source code segment 406 and then execute them. Although FIG. 4 depicts source code segment 406 being associated with only one each of initialization instructions segments 416-420, instructions segment 410-414, and cleanup instructions segment 422-426, in various embodiments there may be one-to-many relationships between a source code segment and these instruction categories. In some embodiments, a source code segment may be associated with an instructions segment containing initialization and cleanup instructions, in addition to instructions for simulating an API function.

In an embodiment, a source code module may contain sets of instructions and information linking the sets of instructions to source code segments in API documentation. For example, an embodiment could contain a set of instructions corresponding to source code segments, a set of initialization instructions, and a set of cleanup instructions. Each of the instruction sets could be linked by program metadata to an identifier usable to locate a source code segment to which the segment pertains.

Figure 5:
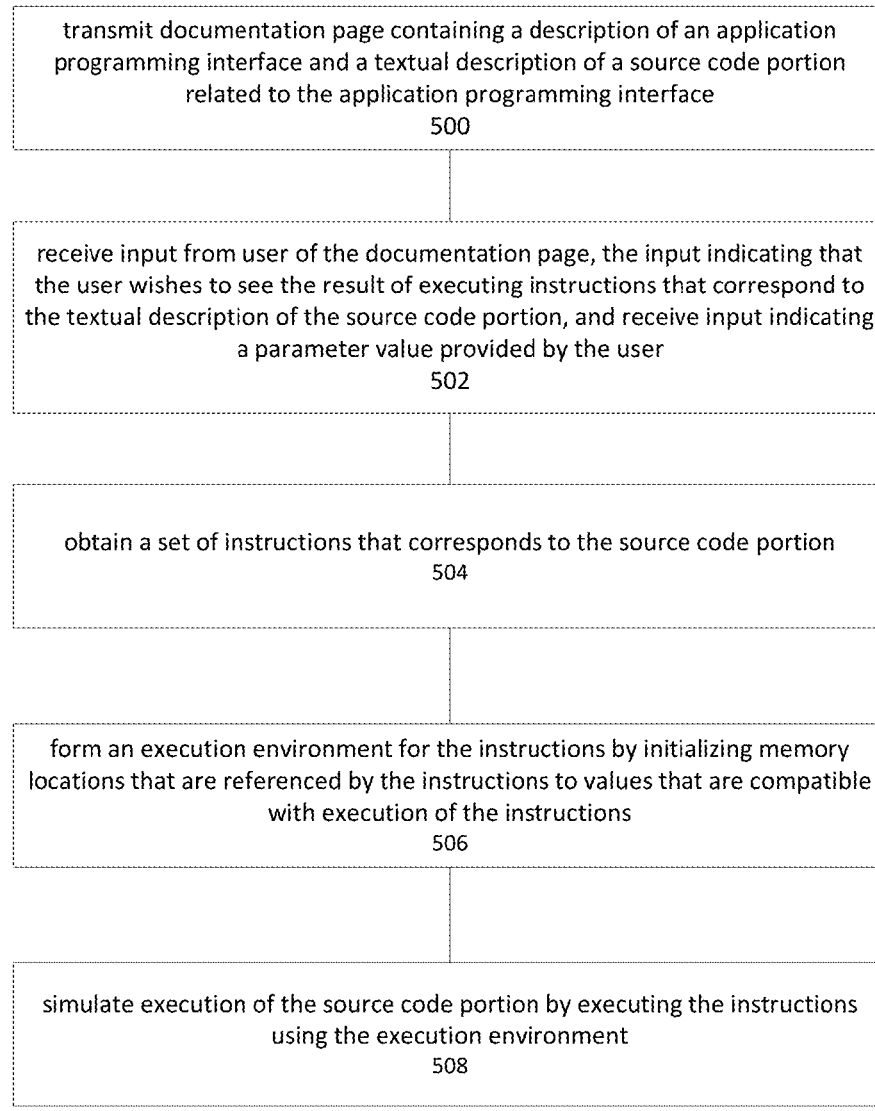
FIG. 5 is a flowchart depicting an embodiment of a process for simulating execution of code portions embedded in API documentation.

FIG. 5 is a flowchart depicting an embodiment of a process for simulating execution of code portions embedded in API documentation. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel. Embodiments of the depicted process may be implemented using various combinations of computer-executable instructions executed by a computing system, such as the computing systems described herein.

Operation 500 depicts transmitting a documentation page to a documentation viewer, such as an HTML-based browser or other application capable of displaying the documentation and supporting the modes of user interaction described herein. The transmitting may be between computing devices over a network, between processes executing on a computing device or between components of a single process executing on a computing device. The term "transmitting" may also be described as conveying information between entities. In an embodiment, a documentation server transmits a documentation page over a network to a client device on which an HTML-based browser is executing and configured to display the documentation.

The transmitted documentation page may contain a textual description of source code, which may be referred to as a source code portion. The source code portion may be related to the content of the documentation. The source code portion may be described as a textual description of source code because, being embedded in documentation, it is not compilable. This may be due solely to being embedded in documentation. However, additional factors may also present barriers to using the source code portion to produce an executable program. There may, for example, be a need to write code to declare variables, perform initialization, perform cleanup and so forth prior to compiling the source code to form an executable program. There may also be a need to write additional source code files such as build files, resource files and so on. A developer might also expend effort writing additional source code for the purpose of visualizing the result of executing instructions corresponding to the source code portion, such as writing output to a console or displaying graphical information.

Note that these steps may present a particular obstacle to developers using API documentation to understand the API. This may be due to the developer not fully understanding the API in question and therefore not understanding its dependencies.

Operation 502 depicts receiving an input from a user of the documentation page that indicates the user's wish to see what the results of executing a source code portion would be, were the source code portion to be included in the source code for a complete program and compiled to an executable file. Receiving the input may involve processing a request to traverse a hyperlink in an HTML file or interacting with any other form of a user interface component. Embodiments may receive additional information related to the request, such as values for parameters that might be related to the source code portion, or an indication of an environment in which the source code portion should be simulated. This might, for example, comprise an indication that the user wishes to see the source code portion simulated as if it were operating on a particular mobile device. In some cases and embodiments, the input received in operation 502 may further comprise information indicating parameter values the user wishes to see used in the simulation. In some cases and embodiments, input may be provided by the user to indicate modifications to the source code segment itself. Embodiments Operation 504 depicts obtaining a set of instructions that corresponds to the source code portion. In various embodiments, the set of instructions may be a function or class method rather than a complete program. In some embodiments, the set of instructions may be a sequence of instructions not initially associated with any function or method. The instructions may be formed through a compilation or interpretation process, retrieved from a repository and so on. If retrieved from a repository, the set of instructions may be transmitted from a source such as the source of the documentation page.

Operation 506 depicts forming an execution environment for the set of instructions, so that the execution environment is compatible with execution of the set of instructions. Forming an execution environment may comprise various operations, as described herein, for initializing memory locations, establishing required state and so forth. The formed execution environment may comprise a program, one or more threads, a virtual machine or other simulated device, and so forth. By executing an appropriate series of preparatory instructions, the environment in which the set of instructions corresponding to the source code portion may be prepared for execution. An appropriate series of follow-up instructions may perform cleanup instructions on the environment.

Operation 508 depicts simulating execution of the source code portion of the documentation by executing the set of instructions within the execution environment. As noted, embodiments may form the execution environment to be compatible with executing the set of instructions as indicated. Simulating execution may also comprise additional operations related to visualization, retention, or performing other processing of the results of executing the instructions.

Figure 6:
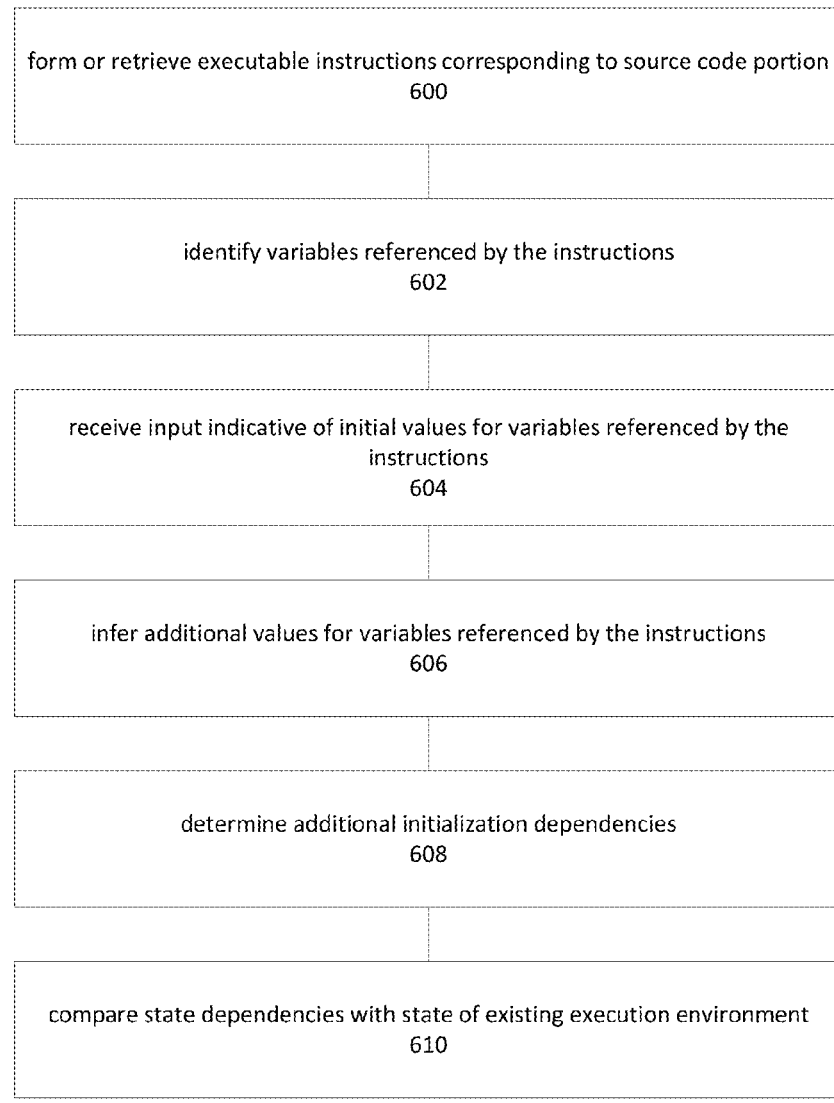
FIG. 6 depicts an embodiment of a process for forming an execution environment for a set of instructions corresponding to a source code portion embedded in API documentation.

FIG. 6 depicts an embodiment of a process for forming an execution environment for a set of instructions corresponding to a source code portion embedded in API documentation. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel. Embodiments of the depicted process may be implemented using various combinations of computer-executable instructions executed by a computing system, such as the computing systems described herein.

Operation 600 depicts forming or retrieving executable instructions corresponding to a source code portion of a documentation file. Embodiments may employ information embedded in or otherwise associated with the source code portion included in the API documentation. For example, the documentation may comprise an XML file with information that relates the source code portion of the documentation to a set of instructions. In some embodiments, the instructions may be embedded in the XML file in a manner not visible to the end user.

Operation 602 depicts identifying variables that are referenced by the set of instructions corresponding to the source code portion. Embodiments may employ various methods for identifying referenced variables. Variables may be identified through indirect techniques such as scanning the set of instructions for unresolved references or parsing the source code portion. Embodiments may also utilize indirect techniques such as identifying an appropriate set of initialization instructions that, when executed, initialize variables referenced by the set of instructions corresponding to the source code portion.

Operation 604 depicts receiving input indicative of initial values for variables referenced by the instructions. Initial values for some variables may be supplied by the user. For example, a developer browsing API documentation might supply certain values for use in the simulation. Initial values may also be retrieved from a repository, included in initialization instructions, stored in the documentation and so on.

Operation 606 depicts inferring additional values for variables referenced by the set of instructions corresponding to a source code portion. For example, an embodiment may infer that a structure comprising multiple variables may need initialization based on an explicit reference in the instruction set to a member of the structure. Multiple levels of dependencies may also be inferred. Embodiments may utilize techniques such as state dependency graphs to infer variables for initialization.

Embodiments may also employ similar techniques with respect to other forms of state information. Operation 608 depicts determining additional initialization dependencies for forming an execution environment whose state is compatible with execution of the set of instructions corresponding to the source code segment. For example, certain API functions may require that other API functions have been previously invoked. A state dependency graph or other technique may be used to identify functions to be invoked prior to executing the set of instructions corresponding to the source code segment.

Some embodiments may, as depicted by operation 610, compare identified state dependencies with the state of an existing execution environment. Embodiments may perform the comparison in order to determine which initialization steps to perform. Embodiments may perform the comparison based on a mapping between initialization dependencies and a current state of an execution environment.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as HTML and XML. A DBMS may comprise various architectural components, such as a storage engine that acts to store data on one or more storage devices such as solid-state drives.

Figure 7:
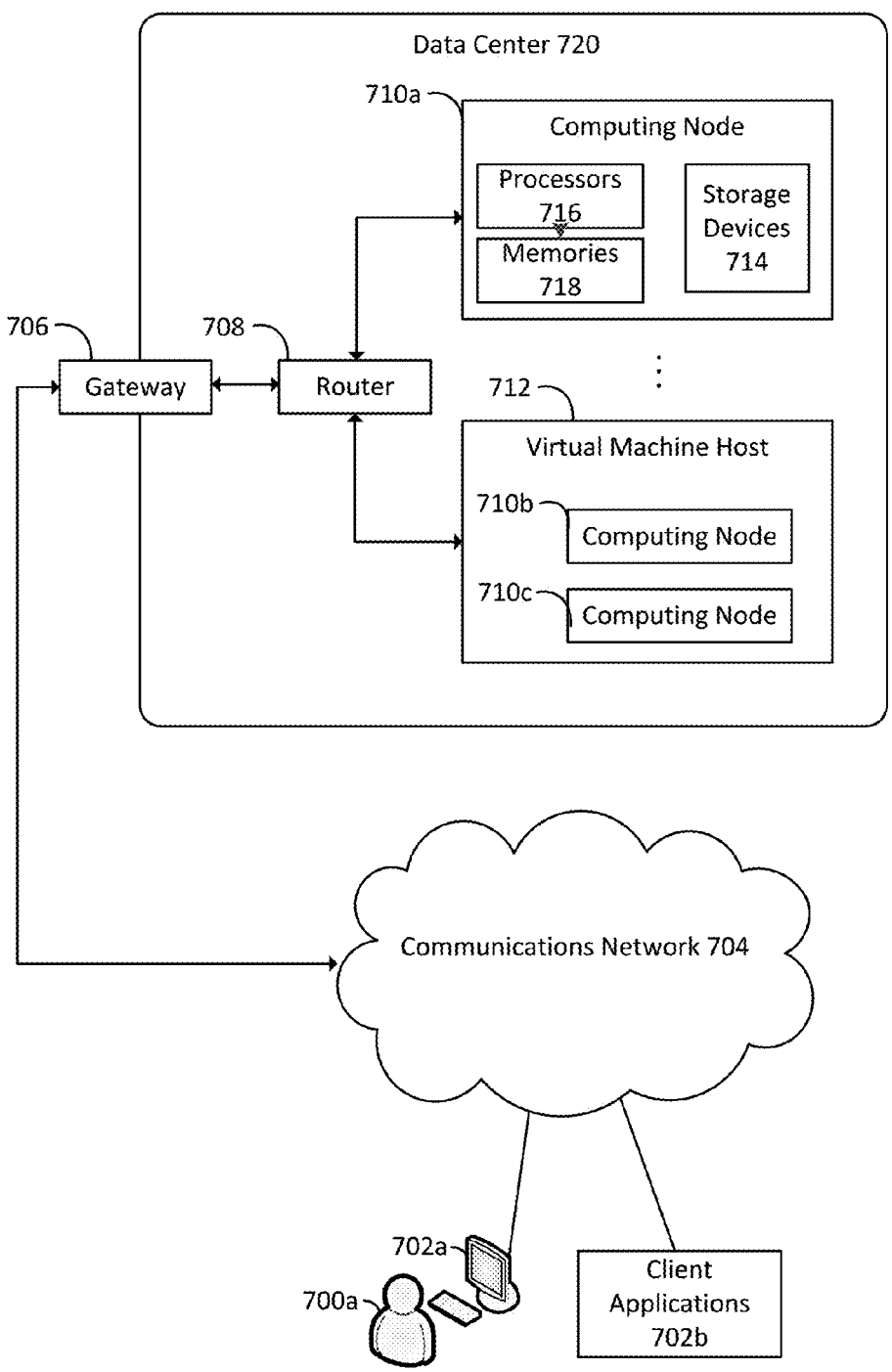
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b and 710c within a data center 720. Alternatively, client applications 702b may communicate without user intervention. Communications network 704 may comprise any combination of communications technology, including the Internet, wired and wireless local area networks, fiber optic networks, satellite communications and so forth. Any number of networking protocols may be employed.

Communication with processes executing on the computing nodes 710a, 710b and 710c, operating within data center 720, may be provided via gateway 706 and router 708. Numerous other network configurations may also be employed. Although not explicitly depicted in FIG. 7, various authentication mechanisms, web service layers, business objects or other intermediate layers may be provided to mediate communication with the processes executing on computing nodes 710a, 710b and 710c. Some of these intermediate layers may themselves comprise processes executing on one or more of the computing nodes. Computing nodes 710a, 710b and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718 and one or more storage devices 714. Processes on computing node 710a may execute in conjunction with an operating system or alternatively may execute as a bare-metal process that directly interacts with physical resources, such as processors 716, memories 718 or storage devices 714.

Computing nodes 710b and 710c are depicted as operating on virtual machine host 712, which may provide shared access to various physical resources, such as physical processors, memory and storage devices. Any number of virtualization mechanisms might be employed to host the computing nodes.

The various computing nodes depicted in FIG. 7 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
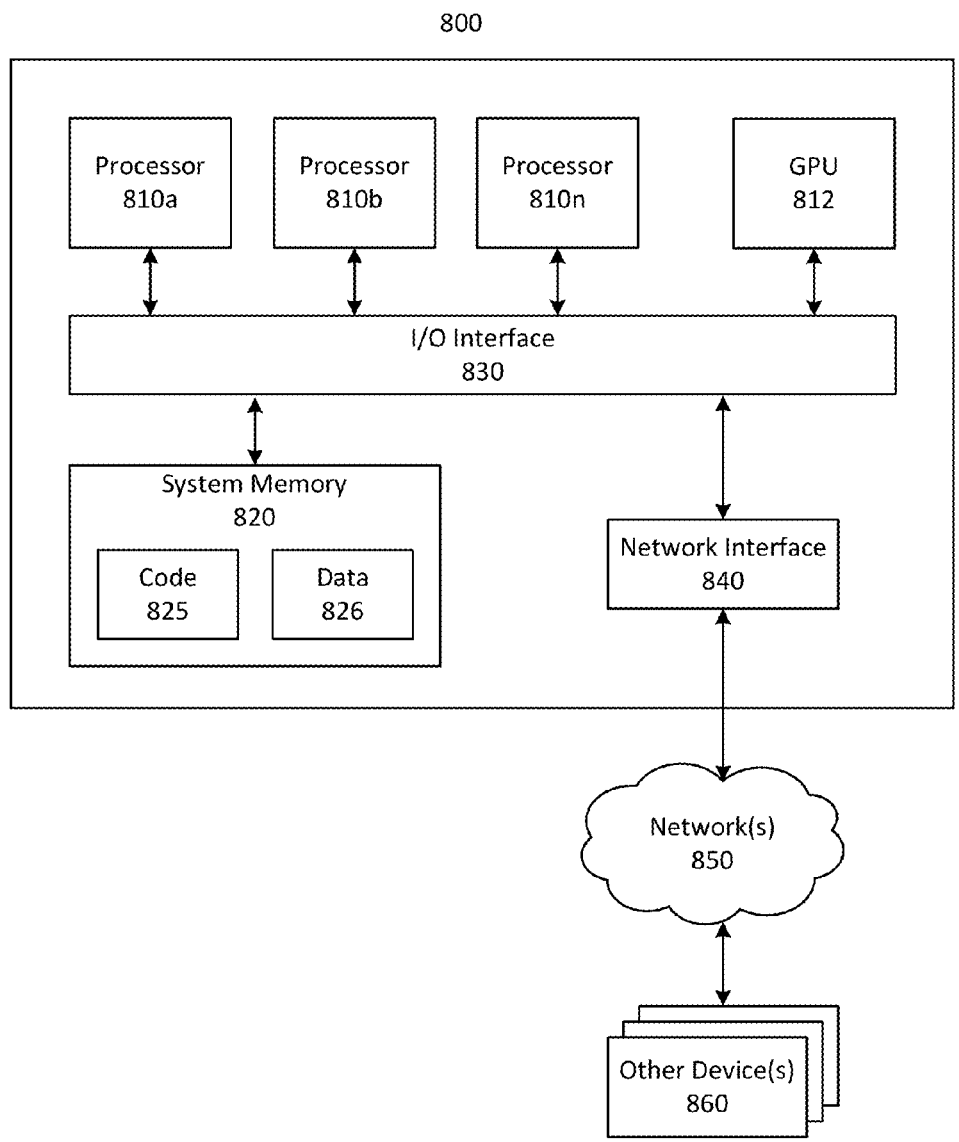
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b and/or 810n (which may be referred herein singularly as a processor 810 or in the plural as the processors 810) coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for providing electronic documentation pertaining to an application programming interface, the system comprising:
   one or more computing devices; and
   one or more memories having stored thereon computer readable instructions that, upon execution by the one or more computing devices, cause the system at least to:
   transmit to a user computing device, in response to a request to display documentation for the application program interface, an electronic documentation page comprising a description of the application program interface and at least one source code portion, the source code portion related to the description;
   receive information from the user computing device indicative of input by a user of the electronic documentation page, the input indicative of simulating execution of the source code portion;
   form an execution environment for a set of instructions corresponding to the source code portion, wherein forming the execution environment comprises at least one of locating or forming the set of instructions, identifying at least one memory location of the one or more computing devices that is referenced by the set of instructions, and initializing the at least one memory location;
   simulate execution of the source code portion by executing the set of instructions, the executing of the set of instructions based at least in part on the execution environment; and
   return a result of simulating execution of the source code portion to the user computing device.

2. The system of claim 1, further comprising one or more memories having stored thereon computer readable instructions that, upon execution by the one or more computing devices, cause the system at least to:
   receive information indicative of a value for the at least one memory location, the value corresponding to input supplied by the user of the electronic documentation page.

3. The system of claim 1, wherein the documentation page further comprises information indicative of the at least one memory location and information indicative of a range of valid values for initializing the at least one memory location.

4. The system of claim 1 wherein the documentation page further comprises information indicative of rendering a graphical depiction of a result of executing the instruction set.

5. The system of claim 1, further comprising one or more memories having stored thereon computer readable instructions that, upon execution by the one or more computing devices, cause the system at least to:
   retrieve the instruction set from a repository of instruction sets, based at least in part on a reference to the instruction set included in the documentation page.

6. A non-transitory computer-readable storage medium having stored thereon instructions that, upon execution by one or more computing devices, cause the one or more computing devices at least to:
   receive information indicative of simulating execution of a source code portion of electronic documentation for an application programming interface;
   load a first set of instructions into an execution environment, wherein the first set of instructions were at least one of located or formed based on correspondence to the source code portion;
   resolve a state dependency of the first set of instructions, wherein the resolving comprises executing an additional set of instructions to cause the execution environment to conform to a state required by the first set of instructions for execution; and
   simulate execution of the source code portion by at least executing the first set of instructions in the execution environment.

7. The non-transitory computer-readable storage medium of claim 6, wherein resolving the state dependency comprises at least one of initializing an application program interface, loading a code module, or setting a value for a variable referenced by the first set of instructions, the value corresponding to input by a user of the electronic documentation.

8. The non-transitory computer-readable storage medium of claim 7, wherein the electronic documentation further comprises information indicative of a valid range of values for the variable.

9. The non-transitory computer-readable storage medium of claim 6, wherein the electronic documentation further comprises information indicative of rendering a graphical depiction of a result of executing the first set of instructions.

10. The non-transitory computer-readable storage medium of claim 6, comprising further instructions that, upon execution by the one or more computing devices, cause the one or more computing devices to at least:

retrieve the instruction set from a repository, based at least in part on a reference to the instruction set included in the electronic documentation.

11. The non-transitory computer-readable storage medium of claim 6, wherein the execution environment comprises a virtual device that corresponds to a physical device associated with the application programming interface, wherein a user may interact with the virtual device after the simulated execution of the source code portion.

12. The non-transitory computer-readable storage medium of claim 6, comprising further instructions that, upon execution by the one or more computing devices, cause the one or more computing devices to at least:

save a result of executing the first set of instructions; and initialize a second memory location referred to by a second set of instructions, the second set of instructions corresponding to a second source code segment, wherein the second memory location is initialized based at least in part on the result of executing the first set of instructions.

13. The non-transitory computer-readable storage medium of claim 6, comprising further instructions that, upon execution by the one or more computing devices, cause the one or more computing devices to at least:

identify differences between state dependencies of the set of instructions and a current state of the execution environment; and resolve the identified differences between the state dependencies and the current state of the execution environment.

14. A computer-implemented method comprising:

receiving, by a computing device, information indicative of input by a user of an electronic documentation page, the document page comprising a description of an application program interface and a source code portion related to the description, the input indicative of a request to simulate execution of the source code portion;

forming, by the computing device, an execution environment for a set of instructions corresponding to the source code portion, wherein forming the execution environment comprises at least one of locating or forming the set of instructions and initializing at least one memory location of the computing device that is referenced by the set of instructions; and simulating, by the computing device, execution of the source code portion by executing the set of instructions based at least in part on the execution environment.

15. The method of claim 14, further comprising:

receiving information indicative of a value for the at least one memory location, the value corresponding to input supplied by the user of the electronic documentation, the value based at least in part on input by the user of the electronic documentation page.

16. The method of claim 14, wherein the electronic documentation page further comprises information indicative of the at least one memory location and information indicative of a range of valid values for initializing the at least one memory location.

17. The method of claim 14, wherein the electronic documentation page further comprises information indicative of rendering a graphical depiction of a result of executing the instruction set.

18. The method of claim 14, further comprising:

retrieving the set of instructions from a repository, based at least in part on a reference to the set of instructions included in the electronic documentation page.

19. The method of claim 14, further comprising:

forming the execution environment based at least in part on state dependencies of the set of instructions.

20. The method of claim 14, further comprising:

identifying differences between state dependencies of the set of instructions and a current state of the execution environment; and resolving the identified differences between the state dependencies and the current state of the execution environment.

\* \* \* \* \*